United States Patent Office 3,714,760
Patented Feb. 6, 1973

3,714,760
HIGH SPEED ROTARY CONTAINER SEALING MACHINE WITH INCLINED SEALING HEADS
Cecil P. Roberts and Charles S. Ochs, Lancaster, Ohio, assignors to Anchor Hocking Corporation, Lancaster, Ohio
Filed Mar. 10, 1971, Ser. No. 122,906
Int. Cl. B65b 7/28, 31/00
U.S. Cl. 53—112 R 22 Claims

ABSTRACT OF THE DISCLOSURE

A sealing machine is disclosed for sealing glass or other containers with closure caps. The sealing machine is of the rotary type having a number of sealing heads mounted on a rotating turret for picking up caps at a cap feeding station and for thereafter applying the caps to containers carried in spaced relation beneath the heads by the rotating turret. The sealing machine operates at extremely high speed and in order to counteract spillage from centrifugal forces on products in the containers has inclined container support means which tilts each of the containers inwardly before and during the sealing operation as the containers move along with the rotating turret. Each of the sealing heads are mounted with their axes having a corresponding inward and upward tilt to align the sealing heads and the closure caps positioned thereon with the inclined rims of the containers.

BACKGROUND OF THE INVENTION

The present invention relates to rotary sealing machines of the type which apply threaded or other closure caps onto the tops of containers, such as glass containers. More particularly, the present invention relates to such a rotary type of sealing machine which is adapted for sealing products, including food products which may be partly liquid or powdered, at higher speeds than has been heretofore possible. Rotary sealing machines have been in use for sometime for filled containers in which the containers are fed onto a rotating container supporting table or turret and where the closure caps are then turned or pressed onto the containers by individual sealing heads or spindles mounted on the turret above the containers for movement along the same arcuate path. Such sealing machines have been developed to the point where they effectively seal containers at fairly high speeds as, for example, the machines shown in prior U.S. Pats. Nos. 2,510,568 dated June 6, 1950; 2,610,779 dated Sept. 16, 1952; 2,915,862 dated Dec. 8, 1959; 3,040,492 dated June 26, 1962; and 3,073,090 dated Jan. 15, 1963 all owned by the assignee of the present invention.

An increasing demand for sealed packages of this type and particularly for certain food products such as baby foods and other high volume food products as well as related improvements inclosure caps and containers and in auxiliary apparatus for container sealing lines has led to a need for higher speed and more efficient sealing machines.

One of the limiting factors in increasing the speed of rotary sealing machines and particularly of rotary sealing machines which handle products which may be partially liquid or powdered, has been the tendency of the liquid or powder or other product to be thrown out of the containers in the arcuate portions of the container paths due to the increased centrifugal forces resulting from the higher container speeds. This problem, for example, has been found to be particularly troublesome in the rotary sealing equipment in the area where the containers are moving under the sealing heads prior to the application of the closure caps.

The present invention provides a novel solution to this problem for rotary sealing equipment while, at the same time, retaining in the machinery the numerous inherent advantages found in the use of the rotary configuration. In particular, the sealing machine in accordance with the invention includes a container entrance and exit means for bringing the containers into the arcuate portion of their path under the sealing heads with a tilting motion which prevents the products spillage and which delivers the containers to and from a generally conically oriented container seating surface for the sealing portion with a smooth and high speed compound container moving action.

Accordingly, an object of the present invention is to provide an improved high speed rotary container sealing machine.

Another object of the present invention is to provide a rotary sealing machine which overcomes the tendency of containers to spill products due to centrifugal forces.

Another object of the present invention is to provide a rotary sealing machine capable of applying threaded closures to threaded containers at extremely high speeds and without product spillage.

Another object of the present invention is to provide a high speed rotary sealing machine adapted for minimizing any tendency for container damage or breakage resulting from centrifugal forces.

Another object of the present invention is to provide a sealing machine adaptable to applying closures by a variety of methods such as by rolling, crimping, pressing, or twisting.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

BRIEF DESCRIPTION OF THE DRAWINGS

FIG. 6 is a vertical sectional view of the container infeeding conveyor taken along line 6—6 on FIG. 5;

DESCRIPTION OF THE PREFERRED EMBODIMENTS

The sealing machine will first be described generally with particular reference to FIGS. 1 through 5.

The sealing machine 1 in accordance with the present invention is used in sealing lines where containers, such as glass containers 2, are first filled with a product at a filler 3 and are then passed on an in-feed conveyor 4 directly from the filler 3 to the sealing machine 1 in a continuously moving line. The sealing machine 1 receives the filled containers 2 and applies threaded or other closure caps 5 to the moving containers 2 forming sealed packages 6 while simultaneously forming a partial vacuum within the packages 6.

Figure 1:
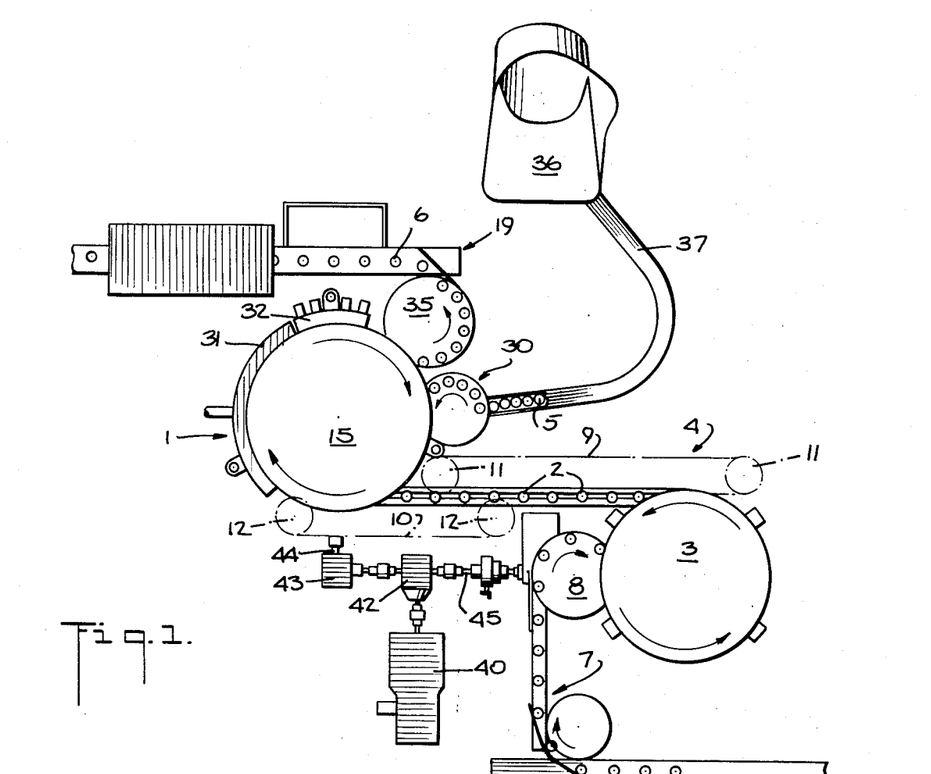
FIG. 1 is a top plan view of a sealing machine in accordance with the present invention in place in a typical sealing line.

FIG. 1 illustrates the sealing machine 1 in accordance with the present invention, receiving filled containers 2 from the filling machine 3 and passing the sealed containers 6 onto an exit conveyor system, illustrated generally at 19. In a typical sealing line, as illustrated, the empty glass containers 2 may be fed into the filler 3 on synchronized moving conveyors 7 and through a spacer star wheel 8 to the filler 3. The filled containers 2 pass from the filler 3 in spaced relationship onto the in-feed conveyor system 4 of the improved sealing machine in spaced relation as illustrated in more detail in FIG. 5.

A preferred embodiment of the in-feed system 4 includes endless container feeding chains 9 and 10 mounted on spaced end sprockets 11 and 12 and including container 2 spacing which corresponds to the spacing of the sealing heads 14 (FIG. 3) on the sealing machine 1 sealing turret 15.

The improved sealing machine 1, in accordance with the present invention, has a container support rail 16 (FIGS. 2, 4 and 5) extending along the arcuate portions of the container path for supporting and for tilting the filled containers 2 inwardly as they move beneath the sealing heads 14 for preventing product spillage due to the relatively high centrifugal forces encountered by the rapidly moving containers 2. As will be described more fully below, the terminal portion 18 of the in-feed system support rail 17, which carries the containers 2 into the rotating container supporting turret 15, has an increasingly inclined surface in cross-section to provide for the inward tilting of the containers 2 in a manner which minimizes product spillage.

Figure 3:
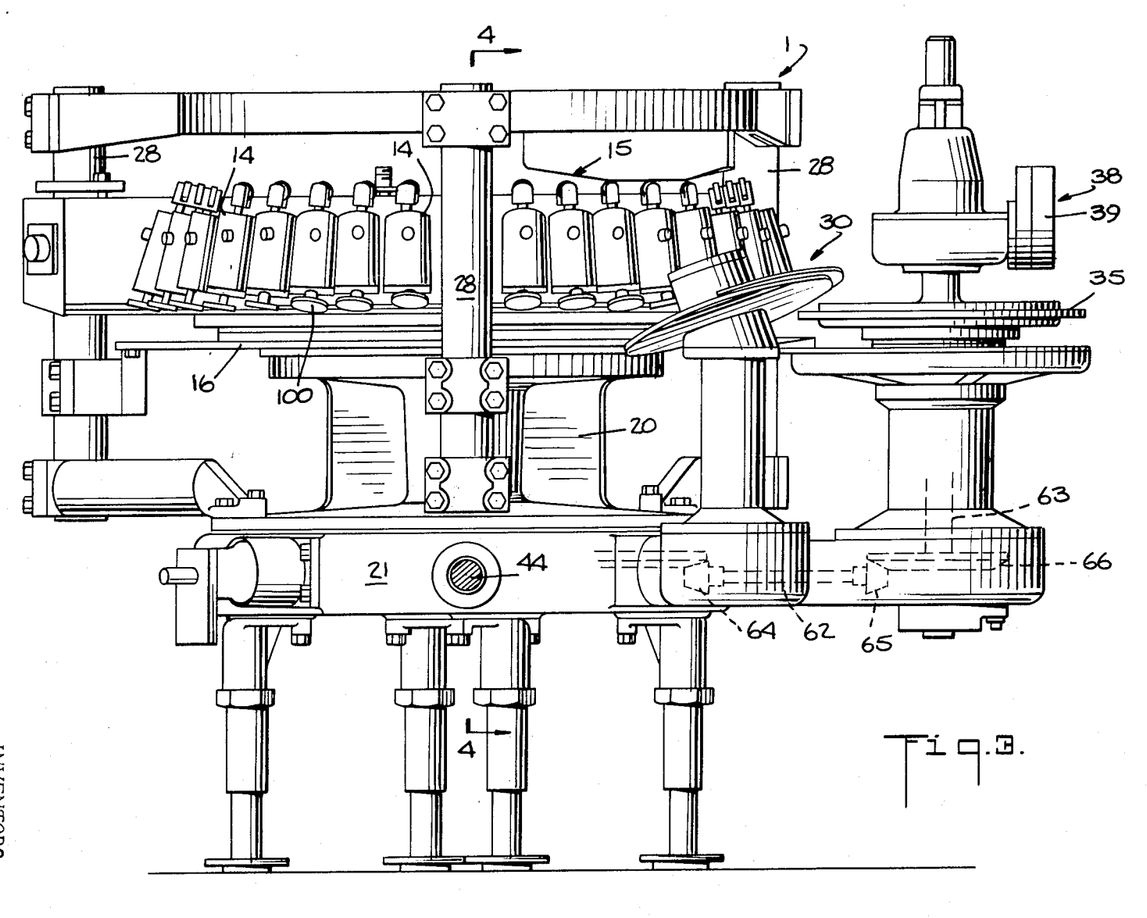
FIG. 3 is an elevational view of a sealing machine in accordance with the present invention.
Figure 4:
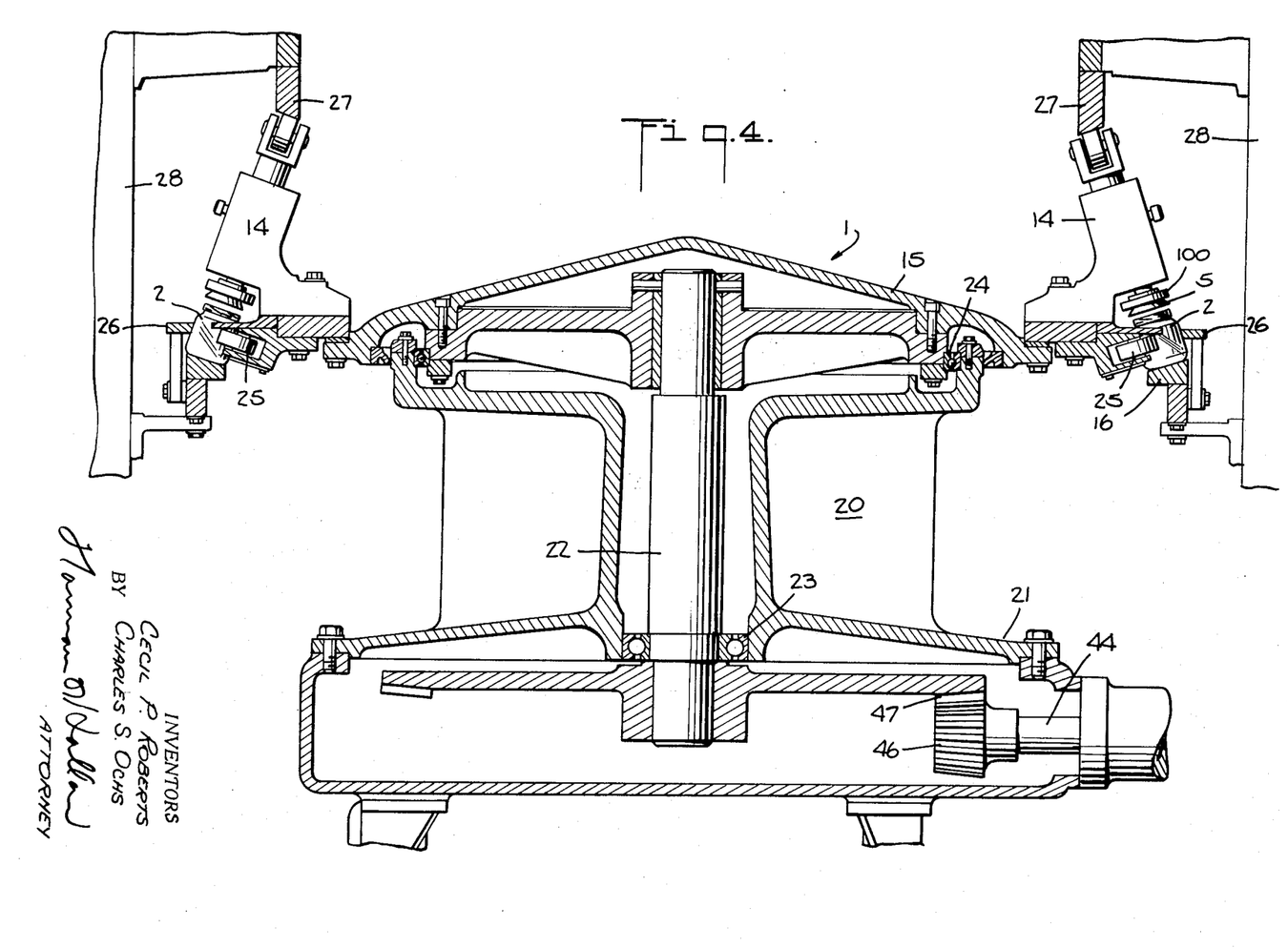
FIG. 4 is a vertical sectional view of the sealing machine taken along line 4—4 on FIG. 3.

The sealing machine 1, as illustrated in FIGS. 3 and 4, includes a support table 20 having a stationary base 21 for rotatably supporting a vertical rotating shaft 22 on a lower bearing 23 and an upper bearing 24. The rotating sealing turret 15 is fixedly attached to the top of the shaft 22 and mounts the sealing heads 14 and the container spacing and moving rollers 25. Each of the containers 2 are engaged between a pair of the container spacing rollers 25 rotatably mounted on the edge of turret 15 and positioned to carry each container 2 underneath one sealing head 14 and along the inclined and arcuate container support rail 16.

The container support rail 16 as well as container guiding side rails 26 and sealing head control cam 27 are mounted on several stationary side posts 28 (FIGS. 3 and 4).

Figure 2:
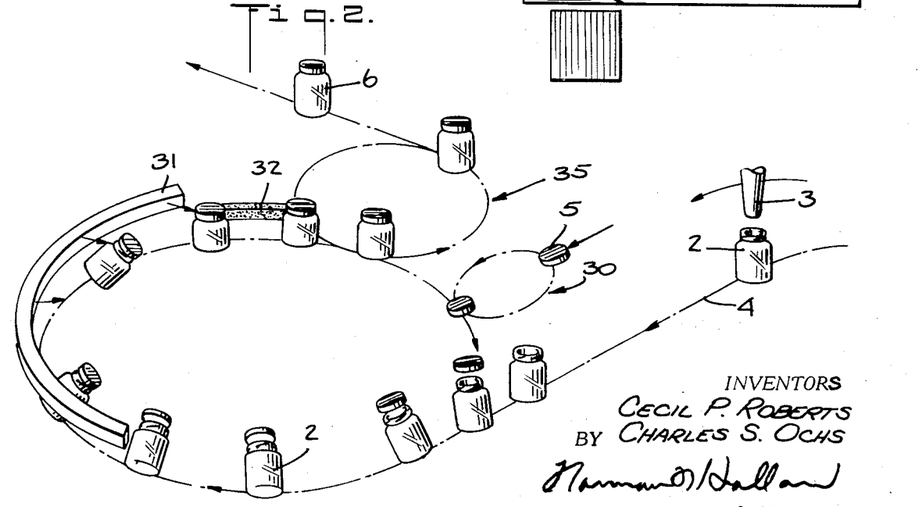
FIG. 2 is a diagrammatic perspective view illustrating the positions of the containers passing through the sealing machine in accordance with the invention.
Figure 5:
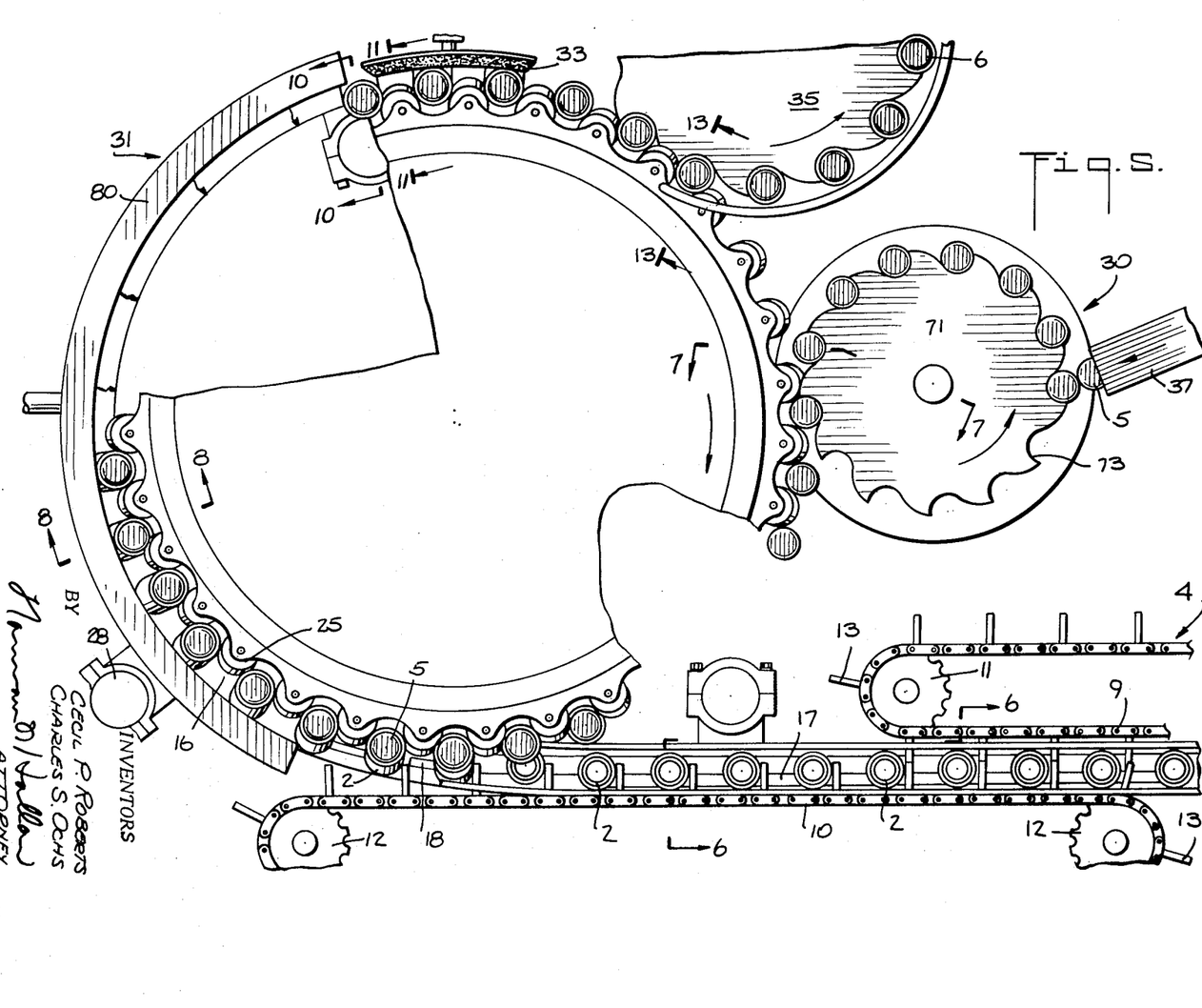
FIG. 5 is a top plan view partially cut away illustrating a sealing machine in accordance with the invention.

As the containers 2 are moved along an arcuate path on the support rail 16 under a sealing head 14, each container 2 and the related sealing head 14 move successively through the several stations of the sealing machine as illustrated diagrammatically in FIG. 2 and in corresponding plan view, FIG. 5. After being moved by the in-feed system 4 into the turret 15, the containers 2 are moved on rail 16 into axial alignment with the closure caps previously positioned under the heads 14 at the cap feeding station 30 which feeds the closure caps 5 from a hopper 36 through chute 37 to the sealing heads 14. The containers 2 now are moved past a vacuumizing station 31 which injects steam under the caps 5 and into the container 2 head spaces. The containers 2 next are carried to the sealing section 32 including a container rotating friction bar 33. The containers are now moved onto an exit surface 34 and to exit conveyor system 19 by an adjacent rotating exit star wheel 35. The several portions of the above described sealing machine will now be described in greater detail with reference being made to the several detailed figures as indicated.

The sealing machine drive system

The general description above describes the sealing machine 1 as having a main rotating turret 15 which carries containers 2 from an in-feed system 4 successively past a rotating cap feed 30 and vacuumizing and sealing stations 31 and 32 to a rotating exit star wheel 35. In order to synchronize the operations of these related elements, the preferred drive system includes a drive motor such as illustrated at 40 in FIG. 1 which is coupled through suitable gear reductions and angle drive systems 42 and 43 to the main turret 15 and drive shaft 44 as well as through an auxiliary drive shaft 45 to the related filler system including entrance star wheel 8.

FIG. 4 shows the inner end of the main drive shaft 44 coupled by a pinion 46 and ring gear 47 to the main vertical drive shaft 22 for the sealing machine turret 15. The in-feed drive system 4 including the spaced feed chains 9 and 10, as shown in FIG. 5, is driven in synchronization with the main turret 15 through the intermediation of the drive system illustrated in FIG. 6 which shows drive shafts 48 and 49 coupled by suitable gears 50, 51, 52, 53 and 54 to the chain 10 sprocket 12 drive shaft 55. A suitable coupling (not shown) between this system and the second synchronized drive chain 9 insures synchronized movement of the two chains 9 and 10 and their attached container engaging finger 13.

Figure 7:
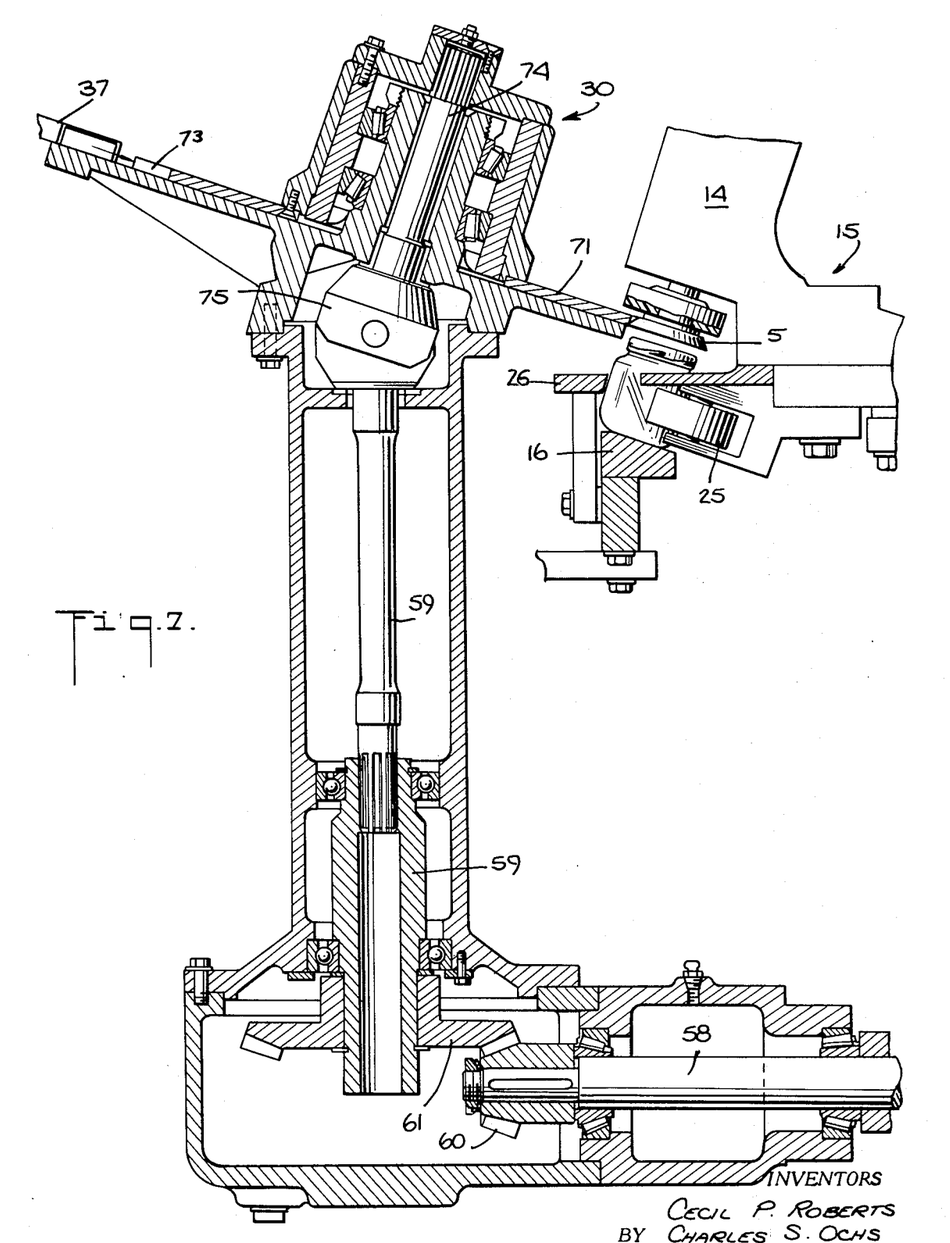
FIG. 7 is a vertical sectional view of the cap feeding means taken along line 7—7 on FIG. 5.

A generally similar power coupling for the cap feed 30 is illustrated in FIG. 7 which shows a horizontal drive shaft 58 whose inner end is coupled to the main turret drive ring gear 47 and whose outer end is coupled to a vertical drive shaft 59 for the cap feed through the intermediation of gears 60 and 61. The exit star wheel 35 which also rotates in synchronization with the rotating main turret 15 is similarly coupled to the turret 15 through the intermediation of a horizontal drive shaft 62 which as shown in FIG. 3, turns the vertical star wheel drive shaft 63 through the intermediation of gears 64, 65 and 66. Other portions of the related sealing line including the feeding conveyors in advance of the filler 3 and the exit conveyors 19 beyond the exit star wheel 35 may be independently driven or may be coupled to the above described system through suitable and generally similar drive couplings.

The sealing machine in-feed system

The in-feed system 4 performs the important and critical operation carrying the filled containers 2 from the filling machine 3 in a continuously moving line into the rotating turret 15 of the sealing machine 1. In performing this operation, the in-feed system 4 exactly spaces and synchronizes the moving containers 2 so that one container 2 enters each pocket between adjacent rollers 25 on the sealing machine turret 1. In addition, the terminal end 18 of the in-feed system 4 adjacent to the sealing machine turret 15 tilts each container 2 from a vertical position to an inclined position so that the containers 2 move onto the sealing machine support rail 16 and beneath sealing heads 14 at the preferred inward tilt for preventing spillage as indicated above.

The rotating filler 3, which is not a portion of the present invention, preferably has inclined container support means which also tilt each container inwardly to prevent spillage by centrifugal force as the filled containers 2 are carried by the filler onto a support rail 17 adjacent to the inner feed chain 9. The support rail 17 at this point may be initially tilted by an amount corresponding to the tilt of the containers in the filling machine as indicated at 70 in FIG. 6. As the filled containers 2 are moved along the support rail 17, the rail has a horizontal position between the overlapping portions of feed chains 9 and 10 as seen at the right hand side of FIG. 5. In this portion of the in-feed system 4, the moving fingers 13 have picked up and properly spaced the moving containers 2 for entry between the rollers 25 in the sealing machine turret 15.

The portion 18 of the support rail 17 between about the end of the inner conveyor 9 and the beginning of the arcuate sealing machine support rail 16 has a progressively increasing inward tilt and an increasing curvature so that the moving containers 2 are fed into the rotating sealing machine turret 15 with an angular alignment and path of movement dictated by the sloping and curving surface of the support rail 16.

Since the centrifugal force generated by the arcuate path the filled containers normally tends to throw a top portion of the liquid and other products out of the containers 2, the inward tilt described above is provided to limit the angular position of the products surface below the spillage point. It has been found, for example, that a convenient container head space for a typical food product permits about an 18° product tilt in a stationary container without spillage. This means that the product within the filled containers 2 may tilt outwardly 18°, with respect to the container rim while in motion, and may also tilt inwardly the same amount without spillage when the machine is stopped. The angle of the upper surface of the support rail 16 is set to permit a total tilt of the product within the moving containers 2 which results from the particular turret size and speed of a particular sealing machine. In a high speed machine, in accordance with the invention, a typical angle for the rail 16 surface may be about 18°. In this case, it is seen that a total product tilt within the containers and with respect to the horizontal of about 36° can be experienced without product spillage.

In order to provide an efficient feeding of the filled jars 2 into the rotating sealing machine turret 15 along the end portion 18 of the in-feed system 4 in a minimum space, a preferred rail curvature and a preferred increasing angle of tilt for the support rail 17 is obtained in the following manner. The angular alignment of the feed rail surface 17 is increased in a linear fashion from the horizontal to the cross-sectional angle of the surface of the support rail 16. The increasing lengthwise curvature of the container 2 path in this same portion of the support rail 17 is laid out to provide for a linear increase in the centrifugal force experienced by the packaged product moving into the adjacent turret 15 and with the increasing container tilt. FIG. 6 shows a filled container 2 being carried along the terminal portion of the support rail by a finger 13 on the outer drive chain 10. The support rail 17 itself is seen to have a slight inward tilt to compensate for the initial inward curvature of the support rail 17 towards the arcuate path of the rail 16 at the sealing machine 1.

The cap feeding apparatus

As indicated in the general description of the sealing machine 1, the caps 5 are applied to the containers 2 in an operation in which the caps 5 are first transferred at the cap feed station 30 from a cap feeding star wheel 71 to a magnetic support 72 on the underside of a sealing head 14. The sealing head 14 holds the cap 5 in spaced relationship from the container 2 as the container 2 moves past a vacuumizing station 31 and thereafter the sealing head 14 moves the cap 5 down into sealing relationship with the container 2 at the sealing station 32.

A preferred embodiment of the cap feeding station 30 is illustrated in FIGS. 5 and 7. FIG. 5 is a plan view which shows the caps 5 being fed out of a cap feed chute 37 into pockets 73 in the rotating cap feeding star wheel 71. The wheel 71 carries the caps 5 in spaced order beneath the heads 14 on the rotating sealing machine turret 15. Since the sealing heads 14 are mounted with their axes being inclined inwardly in line with the tilted container 2 axes, the star wheel 71 is correspondingly tilted so that it rotates in a plane positioned at right angles to the sealing head 14 axes. The star feed wheel 71 is rotated so that its pockets move at the same speed as the sealing heads 14 by the vertical drive shaft 59. In order to obtain the proper constant speed for the tilted cap feed wheel 71 which is being driven by the vertical drive shaft 59, the drive shaft 59 is coupled to the star wheel drive shaft 74 through a universal joint 75.

Container vacuumizing means

Figure 8:
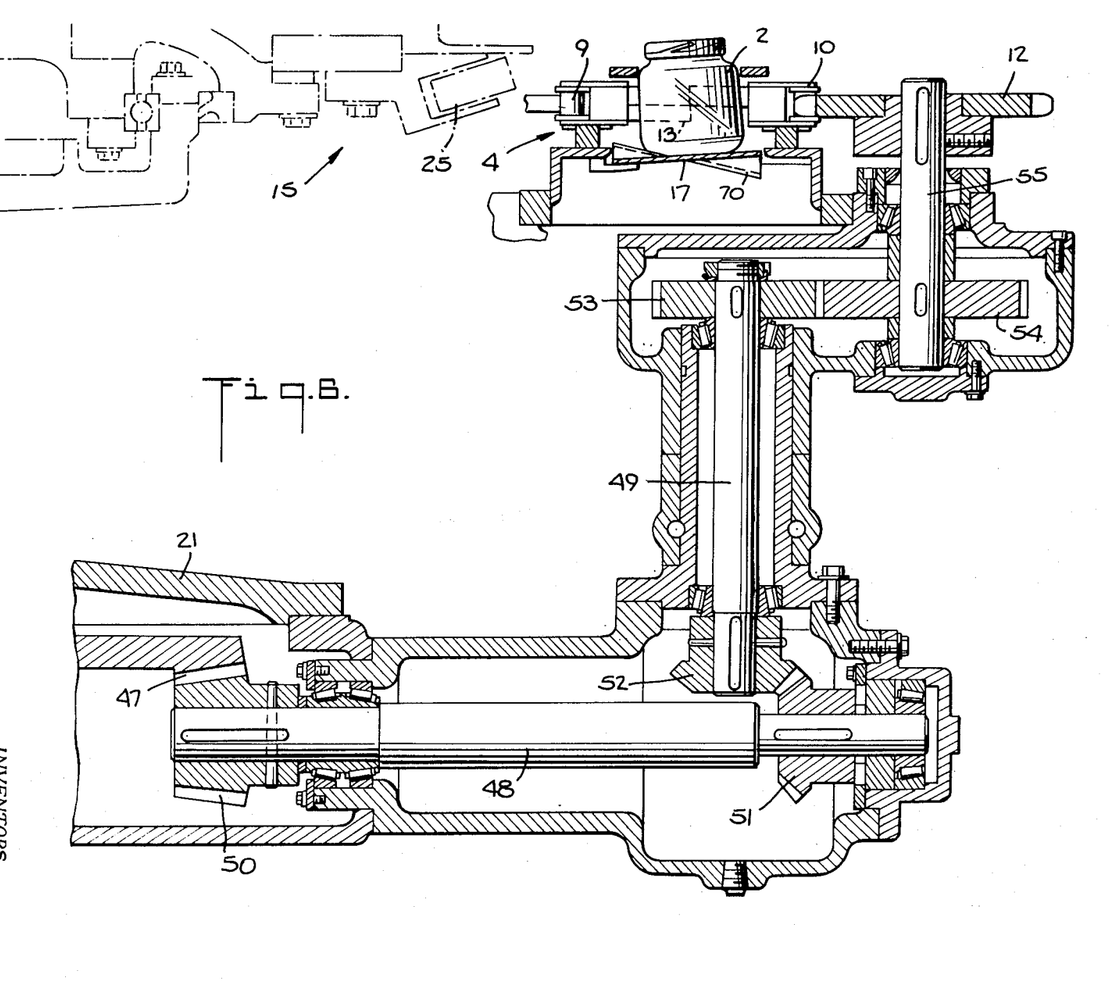
FIG. 8 is a vertical sectional view illustrating the vacuum forming means taken along line 8—8 on FIG. 5.
Figures 8, 9:
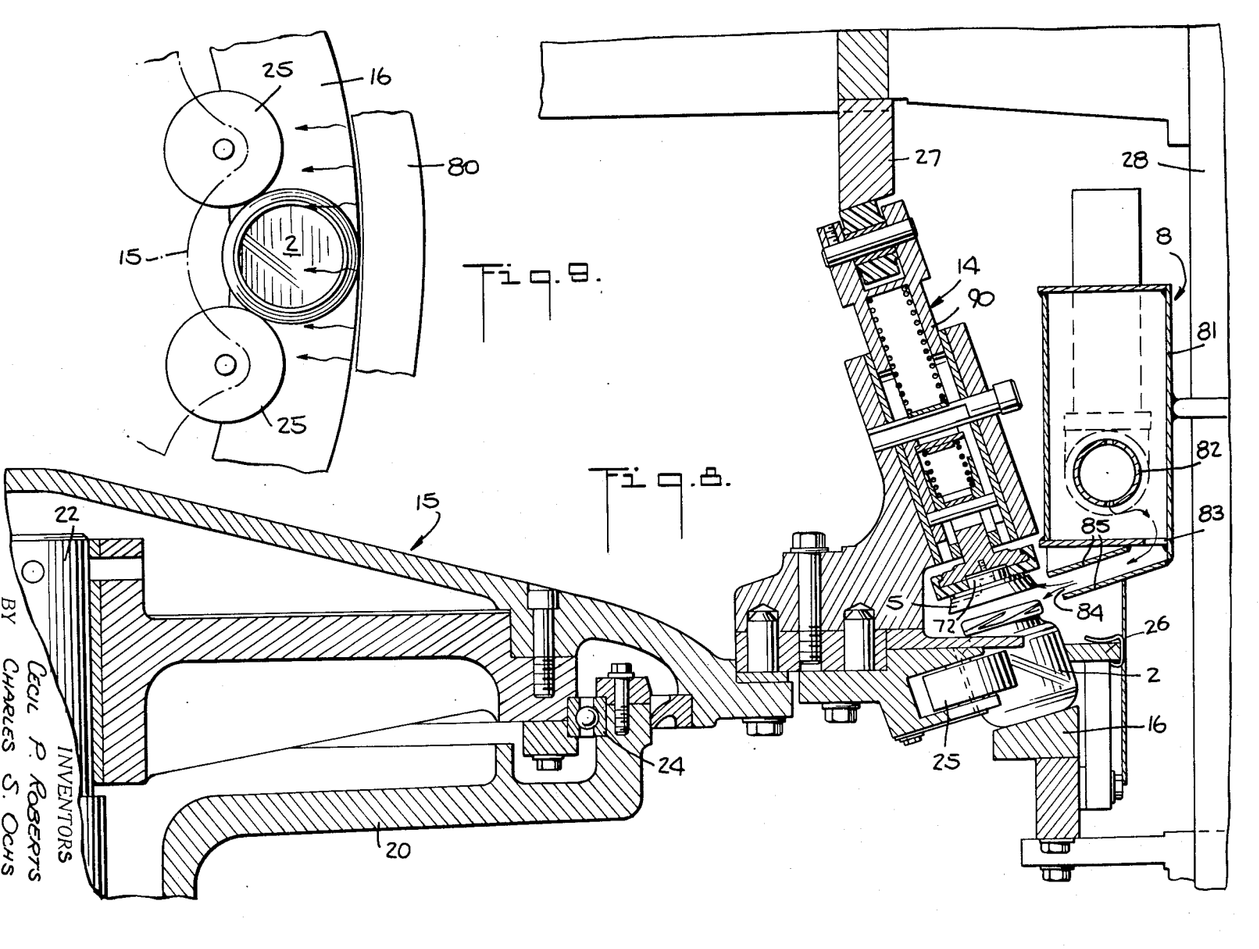
FIG. 9 is a detailed plan view of the vacuum means of FIG. 8.

The improved sealing machine 1 in accordance with the present invention is adapted for sealing a variety of differing products and is particularly adapted for the high speed vacuum sealing of perishable food products. The vacuumizing apparatus at the vacuum station 31 is illustrated in FIGS. 5, 8 and 9.

FIG. 5 is a plan view showing an arcuately shaped steam distributing manifold 80 which forms a sheet or cloud of steam along a corresponding arcuate portion of the container path. FIGS. 8 and 9 illustrate the details of a preferred embodiment of the manifold 80. The manifold 80 includes an upper hollow jacket 81 into which steam is feed from an apertured steam feed pipe 82. An elongated slot 83 in the bottom of the jacket feeds steam through an elongated nozzle or outlet 84 which comprises inclined and spaced guide plates 85 for directing the steam between the closure caps 5 on the sealing heads 14 and the spaced container 2 tops thereby forming a steam atmosphere in the container 2 headspaces and under the closure caps 5. As the sealing heads 14 leave the end of the manifold 80 and move toward the sealing station 32, the sealing head control cam 27 begins the downward movement of the sealing heads 14 and the closure caps thereon towards the containers 2 to trap the steam within the container 2 headspaces.

Figures 10, 11, 12, 13:
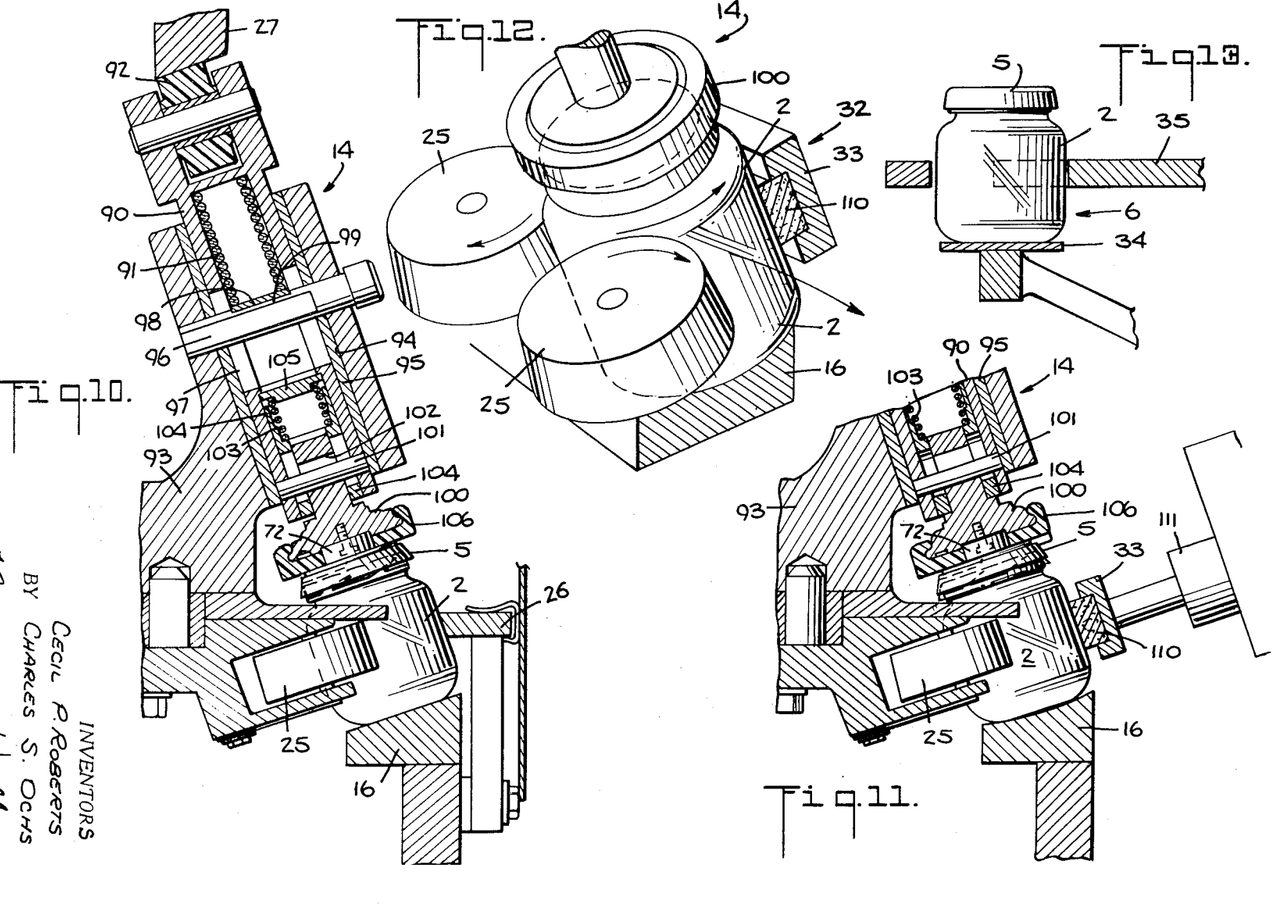
FIG. 10 is a vertical sectional view illustrating the positioning of the sealing head at the beginning of the sealing operation taken along line 10—10 on FIG. 5.
FIG. 11 is a vertical sectional view illustrating the sealing section of the sealing machine taken along line 11—11 on FIG. 5.
FIG. 12 is a fragmentary enlarged perspective view illustrating a container in the sealing section of the sealing machine.
FIG. 13 is a vertical sectional view showing a container in the exit star wheel taken along line 13—13 on FIG. 5.

FIG. 10, for example, illustrates a closure cap 5 moved downwardly into initial engagement with the rim of the container 2 prior to the final downward sealing movement of the sealing head 14 in the sealing station 32.

The container sealing heads and the container sealing station

Each container 2 which is fed into the sealing machine turret 15 and which is positioned between spaced rollers 25 also is positioned beneath a sealing head 14 with the container axis in line with the axis of the sealing head 14.

A preferred embodiment of the sealing heads 14 is illustrated in FIGS. 8, 10 and 11. In FIG. 8, the sealing head 14 is shown with its spindle 90 in a raised position and with the closure cap 5 being held by the magnet 72 in spaced relation to the container 2. In FIG. 10, the sealing head 14 is shown with the spindle 90 having been moved partially down against the force of a coil spring 91 by the arcuate sealing head control cam 27 and the cooperating cam roller 92 on the sealing head 14. FIG. 11 shows the spindle 80 being further lowered for the final sealing operation at the sealing station 32.

The preferred embodiment of the sealing head 14 is seen to comprise a bracket 93 removably attached to the outer edge of the turret 15 and including an angularly aligned bore 94 which slidably mounts the spindle 90 in a bearing 95. The spindle 90 is held in position and against rotation by a pin 96 passing through an elongated suitable slot 97 in the spindle 90. The coil spring 91 is compressed between the top portion of the spindle 90 and a disc 98 seated in a slot 99 in the pin 96 urges the spindle 90 upwardly against the control cam 27.

A sealing shoe 100 is slidably mounted in the lower portion of the spindle 90 and is held in place by a pin 101 fitted through an elongated slot 102 in the shoe 100. A compressed coil spring 103 is positioned between a shoe support sleeve 104 and a washer 105. The downward sealing force of the shoe 100 is seen to be supplied first by the weight of the shoe 100 as it slides upwardly against the force of gravity until it engages the support sleeve 104. Thereafter, the shoe force is determined by the additional spring force of coil spring 103 as the support sleeve 104 is moved upwardly with respect to spindle 90, as illustrated in FIG. 11.

The embodiment of the sealing machine 1 illustrated in the drawings is particularly adapted for applying threaded or lugged closures 5 which are turned onto cap engaging members on the containers 2. The relative rotational motion between the caps 5 and the containers 2 is obtained by turning the containers 2 while the closure caps are initially held against rotation by the resulting friction pads 106 or the bottoms of the sealing head shoes 100. An elongated friction pad 33 engages and rotates the containers 2 is illustrated in FIGS. 5, 11 and 12. The pad 33 includes a friction member 110. A preferred means for holding the pad 110 in engagement with the side walls of the moving containers 2 comprises an air cylinder 111 whose pressure may be adjusted to provide a suitable container turning force.

As illustrated in FIG. 12, a preferred shape of the container engaging rollers 25 is a frusto-conical shape which provides the best contact for each single roller 25 with two adjacent containers 2. This preferred shaping provides a satisfactory engagement between the surfaces of the rollers 25 and the container 2 surfaces since the axes of two adjacent containers are not parallel to one another as they, in effect, each lie on the surface of a cone. The surface of the container support rail 16 at the sealing station 32 preferably is concave or otherwise shaped to facilitate container rotation by reducing the contact area between the containers 2 and the rail 16.

After the closure caps 5 have been applied at the sealing station 32, the problem of product spillage no longer exists so that the surface of the rail 16 may now be angled to return the containers 2 to a horizontal position as they move off of the rail 16 and onto a support plate 34 and as they are carried out of the sealing machine by the rotating star wheel 35 and past a coder 38. The coder 38 is mounted above and is driven in synchronization with the star wheel 35 to facilitate a direct coding of the packages as they pass under the rotating coding wheel 39 of the coder 38.

Alternate embodiment of the container support means

In certain sealing operations as, for example, where a cap may be of the press-on type or may require a crimping operation, an appreciably higher downward sealing force is used on the sealing heads 14. In this case, the higher vertical pressure makes it more difficult to slide the individual containers along a stationary rail such as the above described rail 16.

Figures 14, 16:
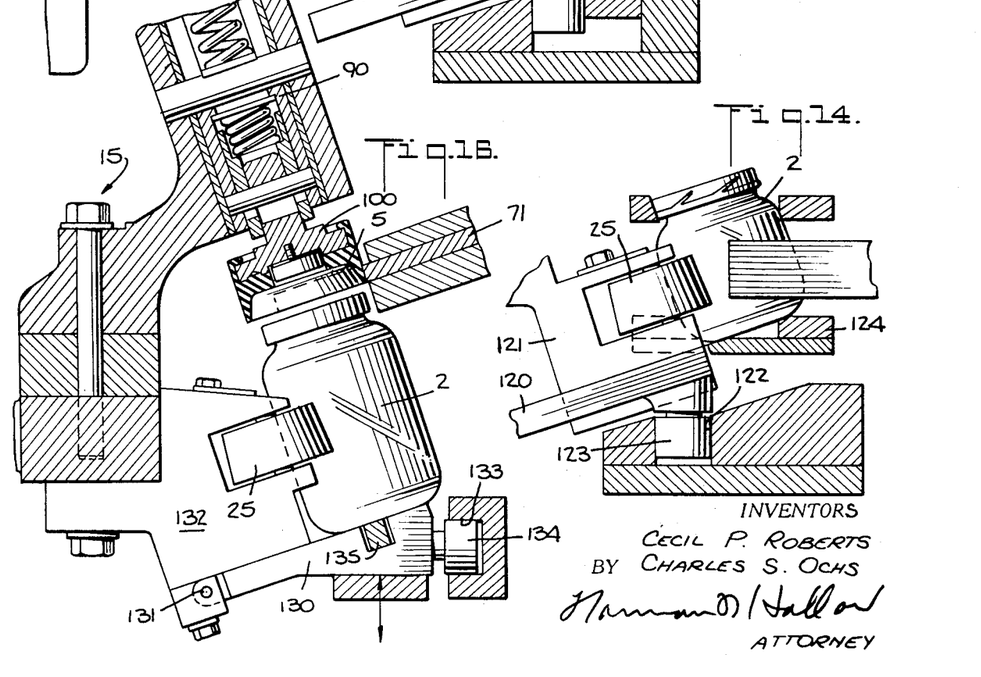
FIGS. 14 and 15 are vertical sectional views of the sealing machine container support and sealing head in an alternate embodiment having individual sliding container supporting plates.
FIG. 16 is a vertical sectional view of the container support and sealing head illustrating a still further embodiment having a pivotally mounted cam-actuated container support.
Figure 15:
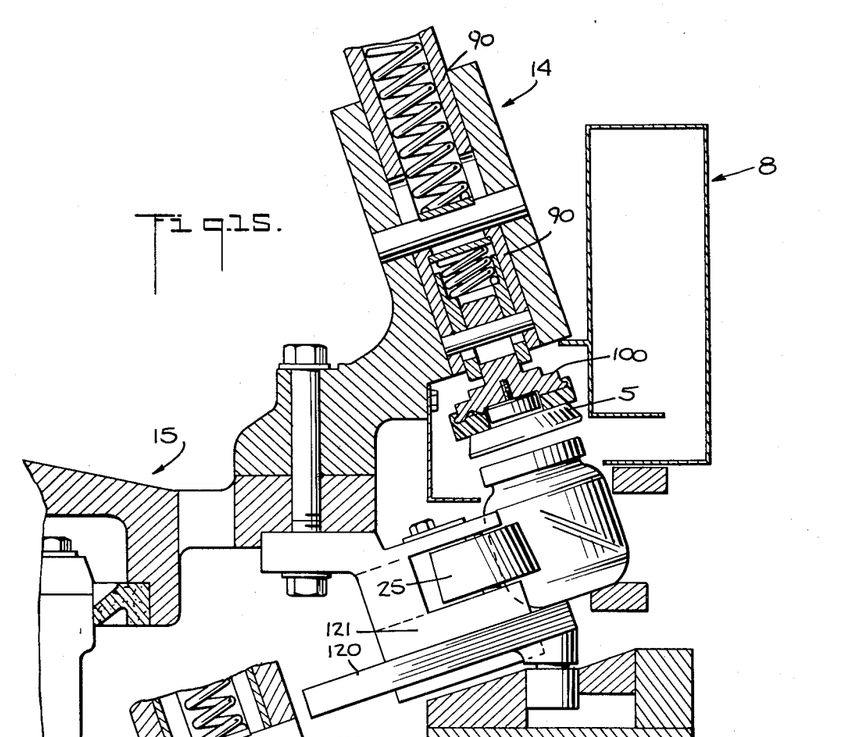

FIGS. 14 and 15 illustrate another embodiment of the sealing machine where the stationary rail 16 is replaced by individual support pads 120 at each container positioned on the turret 15. These pads 120 are slidably mounted for radial movement in the lower portion of the roller support bracket 121 so that they are moved under the control of an elongated stationary cam 122 and a cooperating cam roller 123 from a recessed position, as shown in FIG. 14, to an extended position as shown in FIG. 15. In this embodiment, the terminal end 124 of the in-feed rail is tapered to have a successively narrow cross-section so that as the moving containers 2 are advanced by the turret 15 their bottom portions are gradually engaged by the radially outward movement of the support pads 120 under the control of the cam 122.

FIG. 16 shows another embodiment of the container support means which is also used where greater downward forces are used with the sealing heads 14. In this embodiment, a pivotally mounted support pad 130 is attached by a pivot 131 to the roller support bracket 132 and it is swung from a downward position to an upper support position by an elongated cam groove 133 and a cooperating cam roller 134. In this embodiment, the terminal end 135 of the in-feed rail is tapered down to a relatively narrow cross-section and a groove is supplied in the support pad to accommodate this terminal section 135 as the pad 130 is first swung to its operative position as illustrated and while the container support force is being transferred from the rail section 135 to the support pad 130.

It will be seen that an improved high speed sealing machine has been provided for sealing threaded or other containers with closure caps and which employs the advantages of a rotary sealing machine while eliminating the spillage of products presently experienced in such machines at higher sealing speeds. The machine in accordance with the present invention not only eliminates spillage but it also provides an improved relatively rugged and simple design for both the container handling and the sealing elements of the machine thereby providing a high speed and compact container sealing machine which is easily manufactured at a relatively low cost.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. A rotary sealing machine for applying closure caps to filled containers comprising the combination of
   a base,
   a sealing turret rotatably mounted on said base,
   a plurality of sealing heads mounted adjacent the periphery of said turret and each including a spindle for applying closure caps to containers,
      said spindles having their axes extending inwardly and upwardly of the turret,
   container support means at the edge of said turret having a tilted container support surface generally normal to the spindle axes,
   container in-feeding means having a container support with a progressively curved and tilted terminal portion for feeding containers to said support means with a simultaneously increasing container tilt and path curvature, and
   sealing means for providing relative motion between the spindles and containers on said container support means for forcing the closure caps against the tops of the containers.

2. The sealing machine as claimed in claim 1 in which said container support means comprises a stationary arcuate rail.

3. The sealing machine as claimed in claim 2 in which said rail has a laterally curved support surface adjacent the sealing means for facilitating container motion.

4. The sealing machine as claimed in claim 1 which further comprises means for rotating the container at said sealing means.

5. The sealing machine as claimed in claim 1 which further comprises means for feeding closure caps to said spindles in advance of said sealing means.

6. The sealing machine as claimed in claim 5 in which said closure feeding means comprises a cap feed wheel having its axis generally parallel to the axis of the sealing head spindle positioned at the feeding means.

7. The sealing machine as claimed in claim 1 in which said container support means comprises a support movably attached to said turret beneath each sealing head, and means for moving the support between an inclined container supporting position and a second remote position.

8. The sealing machine as claimed in claim 7 in which said container support comprises a member slidably mounted on said turret, and cam means for moving said member between said positions.

9. The sealing machine as claimed in claim 7 in which said container support comprises a member pivotally mounted on said turret, and cam means for moving said member between said positions.

10. The sealing machine as claimed in claim 1 which further comprises vacuumizing means positioned in advance of said sealing means including a nozzle having an outlet for directing a sheet of steam generally in and above the plane of the container mouths.

11. The sealing machine as claimed in claim 1 in which the terminal portions of said in-feed means has its tilt increased in a linear manner and its curvature increased to cause a linear increase in the centrifugal force on the product in the containers.

12. The sealing machine as claimed in claim 1 which further comprises spacing means for containers on said in-feeding means including endless members with an inner run positioned on opposite sides of the container support, and said endless members having projecting containers engaging fingers.

13. The sealing machine as claimed in claim 1 in which said sealing heads comprise successively activated gravity means and spring means for pressing the closure caps against the containers.

14. The sealing machine as claimed in claim 1 which further comprises spaced frusto-conical rollers on said turret for engaging and spacing containers on said support means.

15. A rotary sealing machine for applying closure caps to containers comprising the combination of
  a base,
  a sealing turret rotatably mounted on said base,
  a plurality of sealing heads mounted on said turret adjacent the periphery thereof each including a spindle for receiving and applying closure caps to containers,
    said spindles having their axes extending inwardly and upwardly of the turret,
  an elongated arcuate stationary container support rail positioned at the edge of said turret having a tilted container support surface generally normal to the spindle axes,
  container in-feeding means having a container support with a progressively curved and tilted terminal portion for feeding containers to said support means with a simultaneously increasing container tilt and path curvature,
  sealing means for moving the spindles towards containers on said container support means for forcing the closure caps against the top of the containers, and
  cap feeding means for placing caps on said spindles including a cap feeding wheel positioned generally parallel to the adjacent portion of the container support rail.

16. The sealing machine as claimed in claim 15 in which said rail has a laterally curved support surface adjacent the sealing means for facilitating container motion.

17. The sealing machine as claimed in claim 15 which further comprises means for rotating the containers at said sealing means.

18. The sealing machine as claimed in claim 15 which further comprises vacuumizing means positioned in advance of said sealing means including a nozzle having an outlet for directing a sheet of steam generally in and above the plane of the container mouths.

19. The sealing machine as claimed in claim 15 in which the terminal portion of said in-feed means has its tilt increased in a linear manner and its curvature increased to cause a linear increase in the centrifugal force on the product in the containers.

20. The sealing machine as claimed in claim 15 which further comprises spacing means for containers on said in-feeding means including endless members with an inner run positioned on opposite sides of the container support, and said endless members having projecting containers engaging fingers.

21. The sealing machine as claimed in claim 15 in which said sealing heads comprise successively activated gravity means and spring means for pressing the closure caps against the containers.

22. The sealing machine as claimed in claim 15 which further comprises spaced frusto-conical rollers on said turret for engaging and spacing containers on said support means.

References Cited

UNITED STATES PATENTS

| 3,040,492 | 6/1962 | Stover et al. | 53—112 R X |
| 3,421,555 | 1/1969 | Minard et al. | 141—150 |

FOREIGN PATENTS

| 956,019 | 4/1964 | Great Britain | 141—145 |

TRAVIS S. McGEHEE, Primary Examiner

U.S. Cl. X.R.

53—308, 317, 331.5